(12) United States Patent
Ronca

(10) Patent No.: US 9,519,669 B2
(45) Date of Patent: Dec. 13, 2016

(54) DOCUMENT INDEXING AND DELIVERY SYSTEM

(71) Applicant: BANK OF AMERICA CORPORATION, Charlotte, NC (US)

(72) Inventor: James G. Ronca, Decatur, GA (US)

(73) Assignee: Bank of America Corporation, Charlotte, NC (US)

( * ) Notice: Subject to any disclaimer, the term of this patent is extended or adjusted under 35 U.S.C. 154(b) by 115 days.

(21) Appl. No.: 13/796,356

(22) Filed: Mar. 12, 2013

(65) Prior Publication Data

US 2013/0191396 A1    Jul. 25, 2013

Related U.S. Application Data

(63) Continuation of application No. 11/554,617, filed on Oct. 31, 2006, now abandoned.

(51) Int. Cl.
| | |
|---|---|
| *G06F 7/00* | (2006.01) |
| *G06F 17/30* | (2006.01) |
| *G06Q 10/10* | (2012.01) |
| *G06Q 40/00* | (2012.01) |

(52) U.S. Cl.
CPC ... *G06F 17/30336* (2013.01); *G06F 17/30011* (2013.01); *G06Q 10/10* (2013.01); *G06Q 40/00* (2013.01)

(58) Field of Classification Search
CPC .................. G06F 17/30864; G06F 17/30867; G06F 17/30067
USPC ........................................................ 707/705
See application file for complete search history.

(56) References Cited

U.S. PATENT DOCUMENTS

| | | | |
|---|---|---|---|
| 5,187,750 A | * | 2/1993 | Behera ................... G06Q 40/02 382/140 |
| 5,701,137 A | | 12/1997 | Kiernan et al. |
| 6,348,935 B1 | | 2/2002 | Malacinski et al. |
| 6,405,215 B1 | | 6/2002 | Yaung |
| 7,383,327 B1 | | 6/2008 | Tormasov et al. |
| 7,506,265 B1 | | 3/2009 | Traut et al. |
| 7,523,187 B1 | | 4/2009 | Lavallee et al. |

(Continued)

FOREIGN PATENT DOCUMENTS

WO    2009012320 A2    1/2009

OTHER PUBLICATIONS

European Patent Examination Report dated Feb. 11, 2011 for Application No. 07 854 530.8.

(Continued)

*Primary Examiner* — Taelor Kim
(74) *Attorney, Agent, or Firm* — Michael A. Springs; Moore & Van Allen PLLC; Peter B. Stewart

(57) ABSTRACT

A document indexing and delivery system is disclosed. Embodiments of the present invention provide an agent-based delivery platform to supply financial document images in a variety of formats to fulfill requests from various clients of an image processing system at a financial institution. Workflows can be created using extensible markup language (XML) to direct the operation of the system. Software agents on the system can include a client agent, a delivery agent, an index agent, a format agent, an image agent, and/or a workflow agent. The workflow agent manages the execution of the workflow. Images and relevant data can be located using a master index residing in partitioned, high-speed databases.

13 Claims, 12 Drawing Sheets

(56) References Cited

U.S. PATENT DOCUMENTS

| | | | |
|---|---|---|---|
| 7,831,689 B2 | 11/2010 | Poisson et al. | |
| 8,055,609 B2 | 11/2011 | Chen et al. | |
| 8,280,716 B2 | 10/2012 | Haviv et al. | |
| 8,375,354 B2 | 2/2013 | Shenfield et al. | |
| 8,438,537 B2 | 5/2013 | Becker et al. | |
| 8,448,170 B2 | 5/2013 | Wipfel et al. | |
| 8,706,947 B1 | 4/2014 | Vincent | |
| 8,732,287 B2 | 5/2014 | Lee et al. | |
| 8,819,695 B2 | 8/2014 | Daute | |
| 9,015,712 B1 | 4/2015 | Hodge et al. | |
| 9,134,992 B2 | 9/2015 | Wong et al. | |
| 9,319,288 B2 | 4/2016 | Somaiya et al. | |
| 9,426,026 B2 | 8/2016 | Rider | |
| 2002/0049963 A1 | 4/2002 | Beck et al. | |
| 2002/0143865 A1 | 10/2002 | Tung Loo et al. | |
| 2003/0120593 A1* | 6/2003 | Bansal | G06F 17/30873 705/39 |
| 2003/0144873 A1* | 7/2003 | Keshel | G06Q 30/02 705/1.1 |
| 2003/0191849 A1* | 10/2003 | Leong | G06F 17/30073 709/229 |
| 2004/0025157 A1 | 2/2004 | Blight et al. | |
| 2004/0078105 A1 | 4/2004 | Moon et al. | |
| 2004/0225865 A1* | 11/2004 | Cox | G06F 17/30477 712/34 |
| 2004/0261060 A1 | 12/2004 | Haselden et al. | |
| 2005/0171899 A1* | 8/2005 | Dunn | G06Q 20/02 705/39 |
| 2005/0216409 A1 | 9/2005 | McMonagle et al. | |
| 2005/0240601 A1 | 10/2005 | Lyons et al. | |
| 2006/0026199 A1 | 2/2006 | Crea | |
| 2006/0031261 A1* | 2/2006 | Behringer | G06F 17/30011 |
| 2006/0039023 A1* | 2/2006 | Supra | G06T 3/00 358/1.13 |
| 2006/0039610 A1* | 2/2006 | Cantral | G06K 9/2054 382/190 |
| 2006/0206863 A1 | 9/2006 | Shenfield et al. | |
| 2007/0094367 A1 | 4/2007 | Esfahany et al. | |
| 2007/0179828 A1 | 8/2007 | Elkin et al. | |
| 2007/0239749 A1 | 10/2007 | Farahbod | |
| 2007/0266136 A1 | 11/2007 | Esfahany et al. | |
| 2008/0140759 A1 | 6/2008 | Conner et al. | |
| 2008/0140760 A1 | 6/2008 | Conner et al. | |
| 2008/0140857 A1 | 6/2008 | Conner et al. | |
| 2008/0201195 A1 | 8/2008 | Cohn et al. | |
| 2008/0294648 A1 | 11/2008 | Lin et al. | |
| 2009/0024713 A1 | 1/2009 | Strasenburgh et al. | |
| 2009/0125796 A1 | 5/2009 | Day et al. | |
| 2009/0201812 A1 | 8/2009 | Dettori et al. | |
| 2009/0249287 A1 | 10/2009 | Patrick | |
| 2009/0319581 A1 | 12/2009 | Seifert | |
| 2009/0327211 A1 | 12/2009 | McCune et al. | |
| 2010/0017783 A1 | 1/2010 | Brininstool et al. | |
| 2010/0023921 A1 | 1/2010 | Chaar et al. | |
| 2010/0077068 A1 | 3/2010 | Saha et al. | |
| 2010/0169150 A1 | 7/2010 | Gremont et al. | |
| 2010/0189103 A1 | 7/2010 | Bachmann et al. | |
| 2010/0199276 A1 | 8/2010 | Umbehocker | |
| 2010/0242013 A1 | 9/2010 | Hao et al. | |
| 2011/0023013 A1 | 1/2011 | Shenfield et al. | |
| 2011/0173303 A1 | 7/2011 | Rider | |
| 2011/0225118 A1 | 9/2011 | Wu et al. | |
| 2011/0276636 A1 | 11/2011 | Cheng et al. | |
| 2011/0276968 A1 | 11/2011 | Kand et al. | |
| 2011/0283263 A1 | 11/2011 | Gagliardi et al. | |
| 2011/0283278 A1 | 11/2011 | Murrell et al. | |
| 2012/0016713 A1 | 1/2012 | Wilcock et al. | |
| 2012/0053974 A1 | 3/2012 | Kulkarni et al. | |
| 2012/0069131 A1 | 3/2012 | Abelow | |
| 2012/0130963 A1 | 5/2012 | Luo et al. | |
| 2012/0167057 A1 | 6/2012 | Schmich et al. | |
| 2012/0216135 A1 | 8/2012 | Wong et al. | |
| 2012/0254834 A1 | 10/2012 | Flurry et al. | |
| 2012/0260228 A1 | 10/2012 | Mallick et al. | |
| 2012/0278786 A1 | 11/2012 | Ruiz et al. | |
| 2012/0297358 A1 | 11/2012 | Kumar et al. | |
| 2012/0311475 A1 | 12/2012 | Wong | |
| 2012/0324069 A1 | 12/2012 | Nori et al. | |
| 2013/0019018 A1 | 1/2013 | Rice | |
| 2013/0055092 A1 | 2/2013 | Cannon, III et al. | |
| 2013/0104150 A1 | 4/2013 | Rdzak et al. | |
| 2013/0110881 A1 | 5/2013 | Bender | |
| 2013/0124253 A1 | 5/2013 | Cooper et al. | |
| 2013/0151491 A1 | 6/2013 | Gislason | |
| 2013/0173768 A1 | 7/2013 | Kundu et al. | |
| 2013/0219297 A1 | 8/2013 | Soundararajan et al. | |
| 2013/0282746 A1 | 10/2013 | Balko et al. | |
| 2014/0068600 A1 | 3/2014 | Ashok et al. | |
| 2014/0075433 A1 | 3/2014 | Kotton | |
| 2014/0195666 A1 | 7/2014 | Dumitriu et al. | |
| 2014/0223431 A1 | 8/2014 | Yoshimura et al. | |
| 2015/0074536 A1 | 3/2015 | Varadharajan et al. | |
| 2015/0188775 A1 | 7/2015 | Van Der Walt et al. | |
| 2015/0229546 A1 | 8/2015 | Somaiya et al. | |
| 2015/0254364 A1 | 9/2015 | Piduri et al. | |
| 2016/0062783 A1 | 3/2016 | Falkco | |
| 2016/0127307 A1 | 5/2016 | Jain et al. | |

OTHER PUBLICATIONS

International Search Report and Written Opinion dated Mar. 28, 2008 for International Application No. PCT/US2007/083087.
Therani Madhusudan et al., "A case-based reasoning framework for workflow model management", Data & Knowledge Engineering, vol. 50, pp. 87-115, XP026976541.
David Hollingsworth, "Workflow Management Coalition the Workflow Reference Model", Internet Citation, [Online], Jan. 19, 1995, pp. 1-55, XP002218704.
Examination Report dated Sep. 16, 2013 for Application No. 07 854 530.8.
European Oral Proceedings dated May 20, 2014 for Application No. 07854530.8.
Canadian Office Action dated Mar. 26, 2014 for Application No. 2,667,798.
Hollingsworth, D., "Workflow Management Coalition, The Workflow Reference Model", Internet Citation, Internet citation, [Online] Jan. 19, 1995, pp. 1-55, XP002218704, Retrieved from the Internet: URL:http://www.wfmc.org/standards/docs/ tc003v11.pdf> [retrieved on Oct. 29, 2002].
Garfinkel, Tal et al., Terra: A Vitual Machine-Based Platform for Trusted Computing, 2003, [Retrieved on Feb. 2, 2016]. Retrieved from the internet: <URL: http://delivery.acm.org/10.1145/950000/945464/p193-garfinkel.pdf?> 14 Pages (193-206).
Guo, Li: Enacting a Decentralised Workflow Management System on a Multi-agent Platform, 2006, pp. 28-31.
Li, Guoli: Decentralized Execution of Event-Driven Scientific Workflow, 2006, pp. 1-7.
Paulley, Glenn, "Loading data in more flexible ways part deux"; http://iablog.; http://iablog.sybase.com/ paulley/2009/07/loading-data-in-more-flexible-ways-part-deux/, Jul. 10, 2009.
Wyatt, Len et al."We Loaded 1TB in 30 Minutes with SSIS, and So Can You"; http://technet.; http://technet.microsoft.com/en-us/libraiy/dd537533, Mar. 2009.
Zhang, Chen: CloudWF: A computational Workflow System for Clouds Based on Hadoop, 2009, pp. 393-403.
Nizzardini, Chris, "MySQL Temporary Tables Example Optimizing PHP Applications"; http://blog.cnizz; http://blog.cnizz.com/2010/11/24/mysql-temporary-tables-example-optimizing-applications-with-temp-tables/, Nov. 24, 2010.
VMware, Increase Longevity of IT solutions with VMware vSphere, Jul. 2010, [Retrieved on Feb. 2, 2015]. Retrieved from the Internet: <URL: http://www.wei.com/insights/VMware-IncreaseLongevityofITSolutionswithVMwarevSphere.pdf> 10 Pages (1-8).
Wikipedia, the free encyclopedia, Service-oriented architecture, http://www.en.wikipedia.org/wiki/Service-oriented_architecture. Downloaded from http://en.wikipedia.org/wiki/Service-oriented_architecture on May 21, 2013.

(56) References Cited

OTHER PUBLICATIONS https://api.jquery.com/ retrieved from the internet on Jul. 15, 2016; 36 pages.
https://api.jquery.com/data/ retrieved from the Internet on Jul. 15, 2016; 6 pages.
PCT International Search Report and Written Opinion, issued in corresponding International Patent Application No. PCT/US2007/083087, Mar. 28, 2008.
India Patent Office, First Examination Report for Application No. 1873/KOLNP/2009, dated Oct. 12, 2015, 2 pages.

* cited by examiner

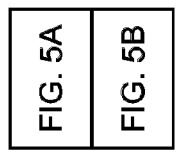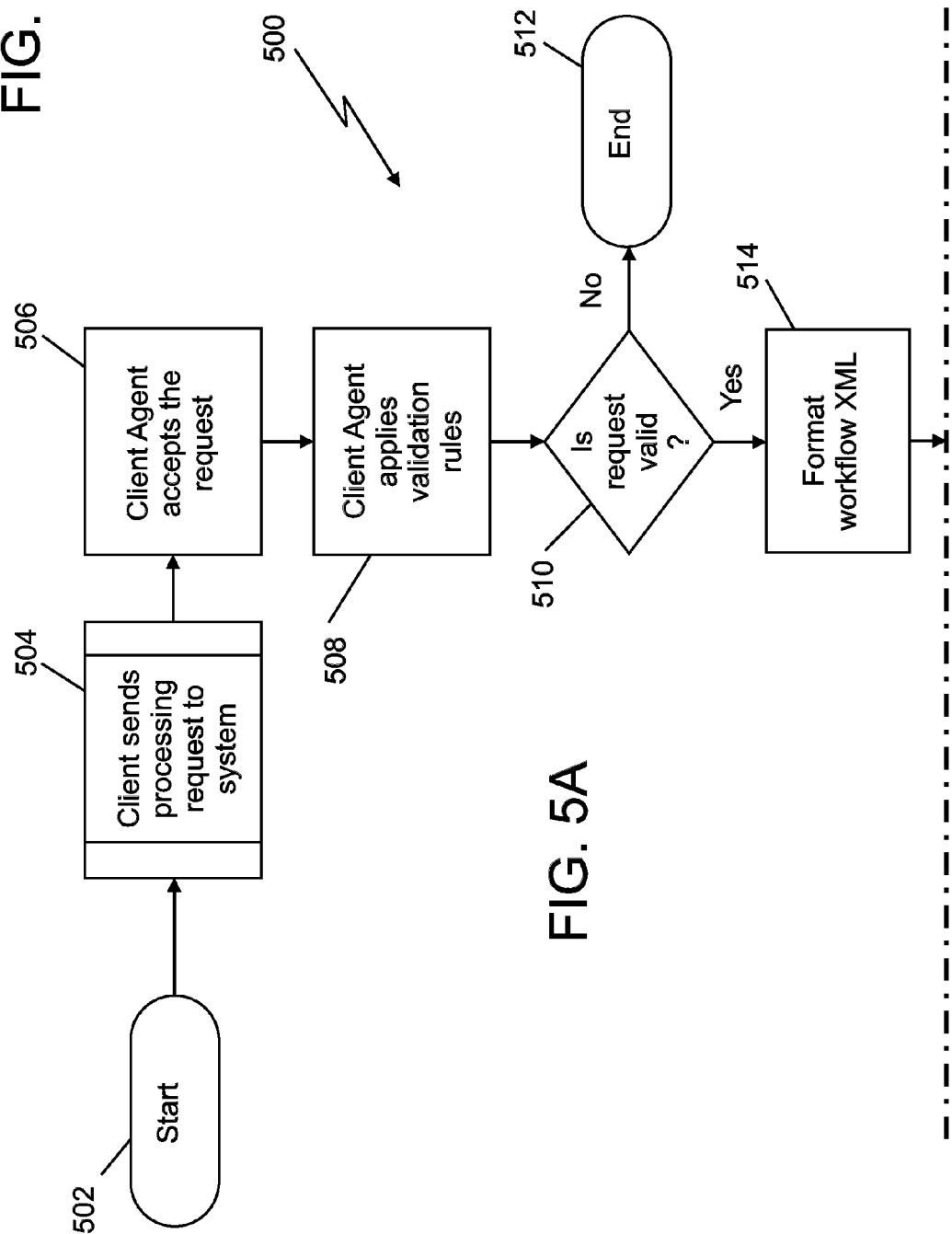

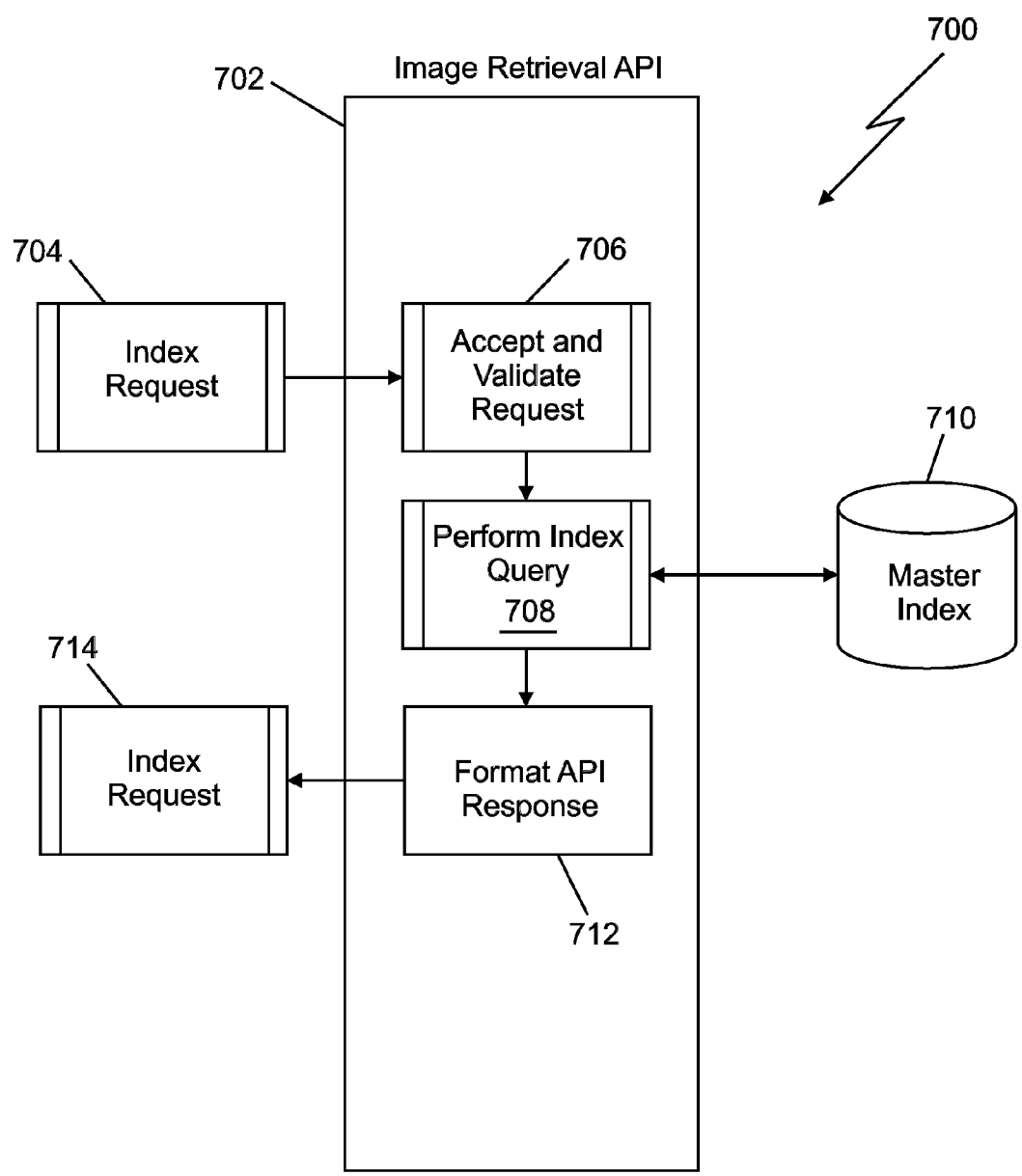

FIG. 8
FIG. 8B
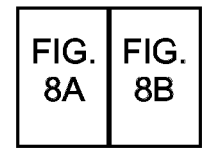
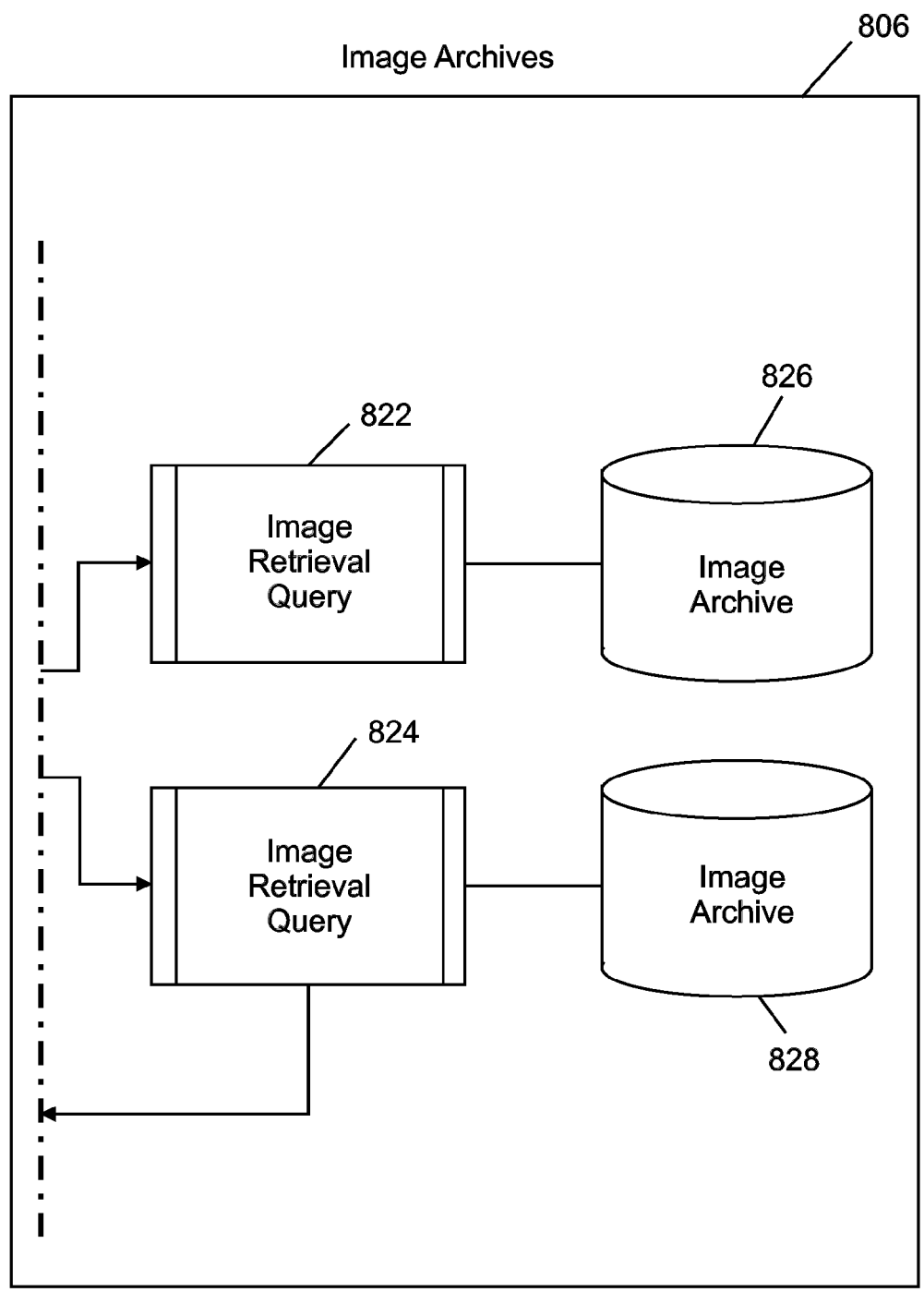

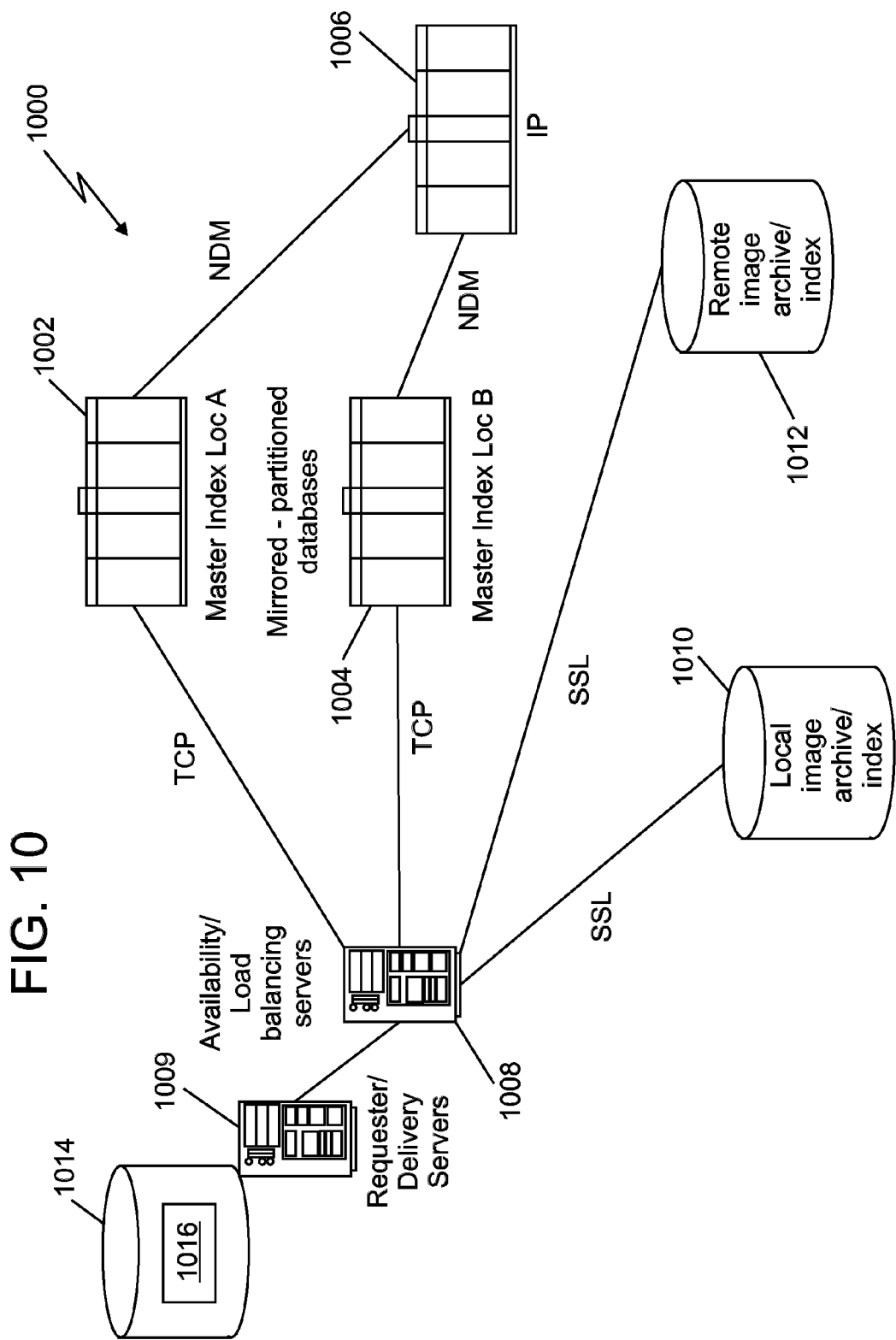

DOCUMENT INDEXING AND DELIVERY SYSTEM

CROSS-REFERENCE TO PRIORITY APPLICATION

This application is a continuation of U.S. patent application Ser. No. 11/554,617 for a "Document Indexing and Delivery System" (filed Oct. 31, 2006), which published on May 1, 2008, as U.S. Patent Application Publication No. 2008/0104022, and which is herein incorporated by reference in its entirety.

BACKGROUND

Financial institutions have established various processes related to the exchange of documents evidencing monetary transactions. Such documents have historically been encoded with magnetic ink so that information from the documents can be read by machine. Such documents have thus become known as magnetic ink character recognition (MICR) documents. Check processing and sorting systems have also been developed in which a check or similar MICR document has its image captured and stored electronically. Such an image can be archived so that it is indexed with its accompanying data from the MICR read.

For some time, banks have been using images of checks for purposes such as statement generation and archiving. Legislation has authorized banks to completely do away with the use of paper for most other purposes, including settlement and reconciliation of accounts between banks. In the United States for example, this legislation is referred to as "The Check Clearing for the 21st Century Act" or simply "Check 21" and authorizes the use of electronic records for purposes such as presentment from one bank to another as long as the images in the electronic records actually represent any original paper documents. A large financial institution must present millions of items each day to clearing financial institutions for posting. Images must also be provided to archive vendors, customers, clearinghouses, government organizations, and the like, all of which might be considered "clients" of the image processing systems of a bank. Information describing the documents and images of the documents must often be produced in numerous formats for different clients and different purposes and through different delivery mechanisms, including bulk delivery mechanisms, where a large number of images from a bank's archive are provided to a client in response to a single request.

SUMMARY

Embodiments of the present invention provide an agent-based delivery platform to supply financial document images in a variety of formats to fulfill requests from various clients of an image processing system at a financial institution. Workflows can be created using extensible markup language (XML) to direct the responding to client requests. Images and relevant data can be located using a master index residing in partitioned, high-speed databases.

In at least some embodiment, when a request for indexed, archived document images is received, a workflow is created to direct at least one of a plurality of software agents to fulfill the request. The master index is searched for the indexed documents according to the workflow. The images can then be retrieved, formatted, and delivered according to the workflow in response to the request. The software agents can include a client agent, a delivery agent, an index agent, a format agent, an image agent, and/or a workflow agent. The workflow agent manages the execution of the workflow, which can be stored as an XML file.

In at least some embodiments, the client agent interfaces with client systems and validates image requests. The format agent formats the files of images and data to be delivered, the index agent searches the master index, and the image agent retrieves images from the archive. Files containing images can be delivered in a variety of ways, including for example, leaving files in a drop zone for retrieval by the client via a network connection such as a secured connection over the Internet.

A document indexing and delivery system according to at least some embodiments of the invention includes an image archive to store images of financial documents, and the master index to maintain information to be used to locate the images. A delivery platform provides images of the financial documents in response to client requests, at least in part by creating the workflows to direct the plurality of software agents on the delivery platform to fulfill the requests by searching the master index and retrieving the images.

An embodiment of the invention can also include one or more servers to provide load balancing between the mirrored, partitioned databases used for the master index. Additionally, an image application program interface (API) can serve to retrieve the images from the image archive in response to the image agent. The image agent, along with other software agents can reside as needed on the delivery platform.

The invention can be implemented via appropriate software or computer program code instructions. These instructions may be in the form of a computer program product, which is installed to run on the servers implementing the delivery platform and other parts of the system. The combination of appropriate hardware and the software to perform the functions described can form the means to carry out the processes of the invention.

BRIEF DESCRIPTION OF THE DRAWINGS

FIGS. 5A-5B (collectively referred to herein as FIG. 5) are a flowchart illustrating how client requests are handled by a system according to an example embodiment of the invention.

FIG. 7 and FIGS. 8A-8B (collectively referred to herein as FIG. 8) are flowcharts which illustrate the process of looking up and retrieving images using the master index and the image API according to example embodiments of the invention.

FIG. 10 is a network hardware block diagram illustrating the operating environment of example embodiments of the invention.

DETAILED DESCRIPTION

Figure 1:
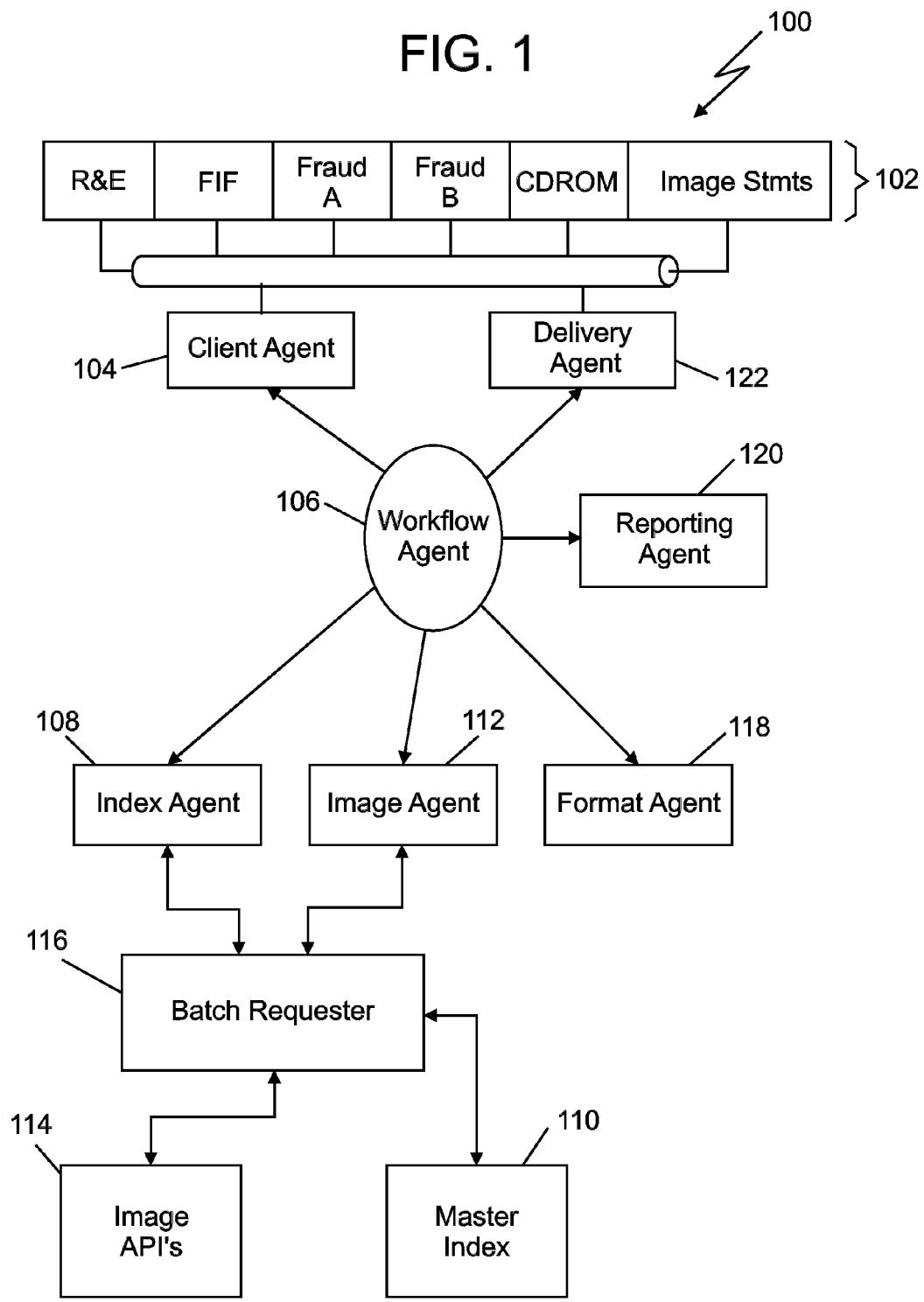
FIG. 1 is a software system block diagram for an example embodiment of the invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, microcode, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The term "bank" and any similar terms are used herein in their broadest sense. Financial institutions that process transactions and documents of the types discussed can include stock brokerages, credit unions, and other types of institutions which are not strictly banks in the historical sense. Even retail and other service businesses, as well as manufacturers may process documents and/or data as disclosed herein. The use of terms such as bank, "institution" or "franchise" herein is meant to encompass all such possibilities.

Much of the terminology herein refers to the processing of information about MICR encoded documents. This information can be stored in a data processing system, in computer memory and/or media for retrieval and manipulation. There are many ways to design a system to accommodate the storage of this information, as well as the storage of electronic images of documents such as checks. For example, this terminology can refer to information stored in what is commonly known as a "check image management system" (CIMS) and within a "check processing control system" (CPCS). Such systems are well known within the banking industry by those who work in the financial data processing fields.

Check images and data about the checks the images represent, such as index information referring to the check images, which typically includes the MICR data, can be stored by processing systems according to any of various industry standard formats, for example, the well-known common import file format (CIFF). Such systems have been used for many years by many banks to archive check images. Images and index information in such a system can be stored in the same file or separated. In some environments, the index information is separated and stored in an electronic cash letter (ECL) for communicating between financial institutions for the purpose of settlement. Images can additionally be stored in various tagged image file format (TIFF) formats, includes the known, "stacked" TIFF format in which images are concatenated together in TIFF format with their offsets indexed so that individual images can be located.

Index information can also be stored with electronic images in an "image cash letter" (ICL) to provide for the truncation of the paper documents. Again, these systems and techniques are well known by those of ordinary skill in the financial information technology arts. A well-known industry standard format for a cash letter file that contains both images and all data necessary to index and understand the images is the X9.37i format, which is promulgated by the American National Standards Institute (ANSI).

As previously discussed, embodiments of the present invention use software agents to process client requests, find and retrieve document images and any necessary accompanying data, and deliver those images to clients as appropriate. For purposes of this disclosure, an agent is a defined software object that performs specific functions to support the system. In example embodiments of the present invention, agents are broken down into two types, specialized agents and processing agents. Processing agents provide a common service for all requests according to details that are provided through task definitions. Task definitions provide details to the agent to support a particular client's processing request. Specialized agents do not follow the same rules as processing agents. While specialized agents are similar in the way they can be defined, their role in the system of the example embodiments is greater than that of processing agents. Not only are the specialized agents charged with performing a specific function, such as formatting data or following an XML workflow, but the specialized agents are also required to evaluate compliance with business logic rules in some instances. These business logic rules allow the specialized agents to validate requests prior to processing, and to manage the execution of workflows that define how the system responds to requests.

FIG. 1 is a software block diagram illustrating how the agents and other software entities in a system are organized according to example embodiments of the invention. System 100 provides images in bulk to various clients 102 by delivering appropriate files to a drop zone or by sending them to client systems. A drop zone may consist of a secure file transfer protocol (FTP) site or other type of server or system where image files can be retrieved by clients when needed. Client systems 102 in this example include returns and exchange handling systems (R & E), fraud detection systems (two systems, A and B), a CD-ROM system to store images for delivery on optical discs, and a system that provides image statements to customers. Also included is film and image fulfillment (FIF), which is a client that fulfills image requests for systems that don't have direct access to the image systems and therefore still work with other media such as microfilm.

Still referring to FIG. 1, client agent 104 is a specialized agent as previously discussed. Client agent 104 accepts a work request from the requesting client system, validates the request, and then translates the request into a bulk processing format, which in example embodiments is workflow XML that is stored in a file, which may also be referred to herein as a "workflow." The workflow XML contains all the information for all downstream processing agents to perform their functions. For example, if a client system is looking for data from a lockbox image archive of a bank using the invention, the image agent can be provided with details in the form of workflow XML that tells the image agent to retrieve data from the lockbox archive. These details are called tasks and will be further discussed later with respect to FIGS. 2, 3, and 4. The workflow XML can contain zero to many tasks for each processing agent in the system. The ability to create customized XML for each request provides flexibility in processing to enable the system to fulfill a wide variety of client requests. In the event that more than one task is needed, the processing agent supporting those tasks can run multiple times for a request until all the tasks required are completed.

In addition to the tasks as described above, the workflow XML defines when the agents will run based on various dependencies. For example, one agent may not be able to run before another agent completes its tasks. Such dependencies may come about because one agent requires data from another agent. The workflow XML can define this dependency between these agents and ensures that the proper flow is maintained. Dependencies between agents can be either serial or parallel in nature. Thus, some agents can execute their processes together using results of previously run agents as input. In example embodiments, system status can be reported while agents are running.

Still referring to FIG. 1, workflow agent 106 accepts workflow XML from client agent 104 and is responsible for delivering it to the other agents in the system. Workflow agent 106 also accepts workflow XML back from various processing agents as they complete their tasks and then directs the execution of tasks by other processing agents as needed. Workflow agent 106 serves to manage the operation of the entire system. The arrows leading from workflow agent 106 to the other agents are intended to indicate the workflow agent performing its control functions, not necessarily the direction of flow of data or information between agents.

The processing agents in the embodiment of FIG. 1 are stateless and are responsible for specific functions required to fill client requests. These functions are common to all requestors of the bulk delivery system shown in this embodiment. The state information that each processing agent maintains is related to the systems to which the agent must interface. This relationship reduces the level of knowledge needed by clients of backend systems such as the indexing system. Index agent 108 is responsible for requests that require index systems to be searched to support image delivery. In this example embodiment, master index 110 is shown as an index system. The nature of master index 110 will be discussed in further detail with respect to FIGS. 7, 8, and 9. Index agent 108 uses tasks to define how each request will be processed. Task level details are found in the XML workflow. For example, the XML workflow could tell the index agent which database to query against and if needed, which data is necessary for delivery of the information required by the client requests. For example, some clients would need all of the data associated with a financial document while others may only need certain portions of the data. To provide this differentiation, tasks can be defined down to the data level so that the index agent need not maintain any state information about a particular client.

Still referring to FIG. 1, image agent 112 is responsible for image retrievals from archive systems. In example embodiments, image agent 112 is programmed to understand the details of the needed image retrieval process only. Upon retrieval of the data, the image agent stores the images on media that is accessible to other processing agents so that the other processing agents can access the images as necessary. In this example, image agent 112 can connect to multiple image archive systems using image application program interfaces, 114. These archives might include for example, a long term image storage archive, a short term image storage archive, and a lockbox archive. Note that in this example embodiment, connectivity for both the image agent and index agent to both an image API and the master index is provided by a batch requestor layer, 116.

As previously discussed, the workflow XML defines when the agents will run based on dependencies. In this example, the image agent cannot run before the index agent completes its tasks. This dependency comes about because the image agent requires index data from the index agent to know which images to access and how to access those images. The workflow XML defines this dependency between these agents and ensures that the proper flow is maintained.

Continuing with FIG. 1, format agent 118 takes data results from index agent 108 and image agent 112 and formats them into files that can be processed by clients. Formatting agent 118 in this embodiment therefore has its tasks defined at the client level. This client-level definition provides a way for the system to provide any format of file in response to a client request. Formats for check images and their accompanying data have already been discussed. In addition to these formats, format agent 118 can be appropriately tasked to provide specific, proprietary formats whenever those formats have been defined to the financial institution by the client.

FIG. 1 also shows a reporting agent, 120, and a delivery agent, 122. The reporting agent is responsible for reporting back to the client and to the system's administrators or operators the status of the handling of client requests. The format of the report depends on needs defined through the task and workflow mechanisms already described. The delivery agent is responsible for moving the results of client requests to a location defined by the client in the request. As previously discussed this may include delivery to a drop zone, transmission via a network, or, burning onto a CD-ROM as referred to above in the discussion of client systems, 102.

Figure 2:
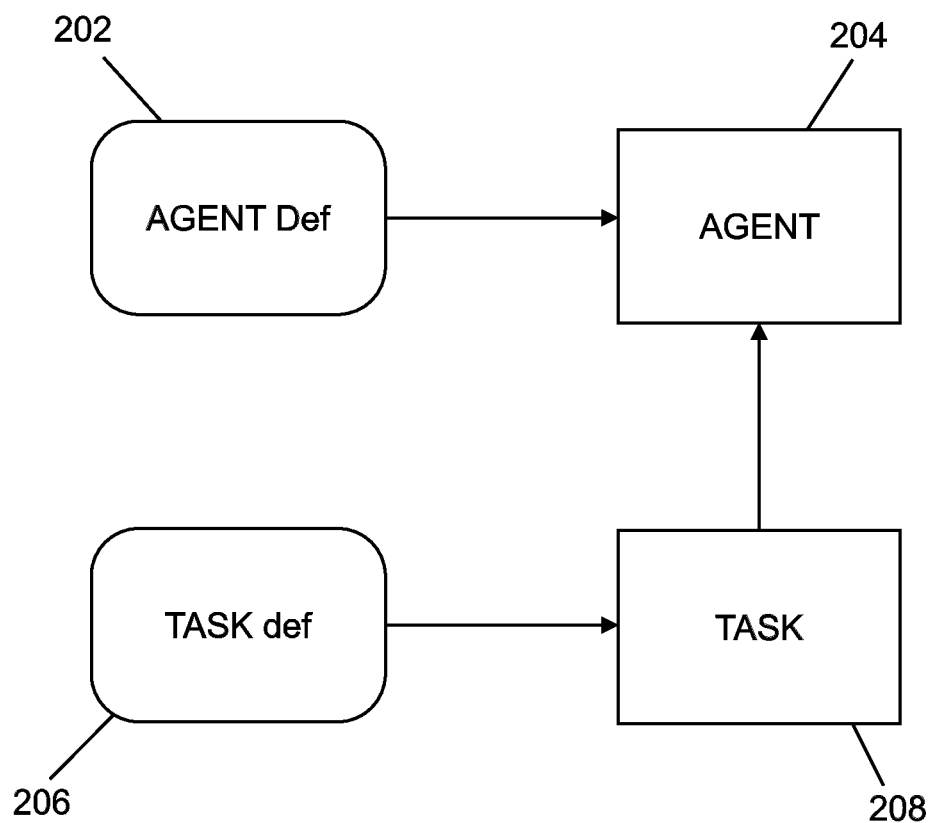
FIGS. 2, 3, and 4 are conceptual block diagrams that describe how software agents are created and maintained according to example embodiments of the invention.
Figure 3:
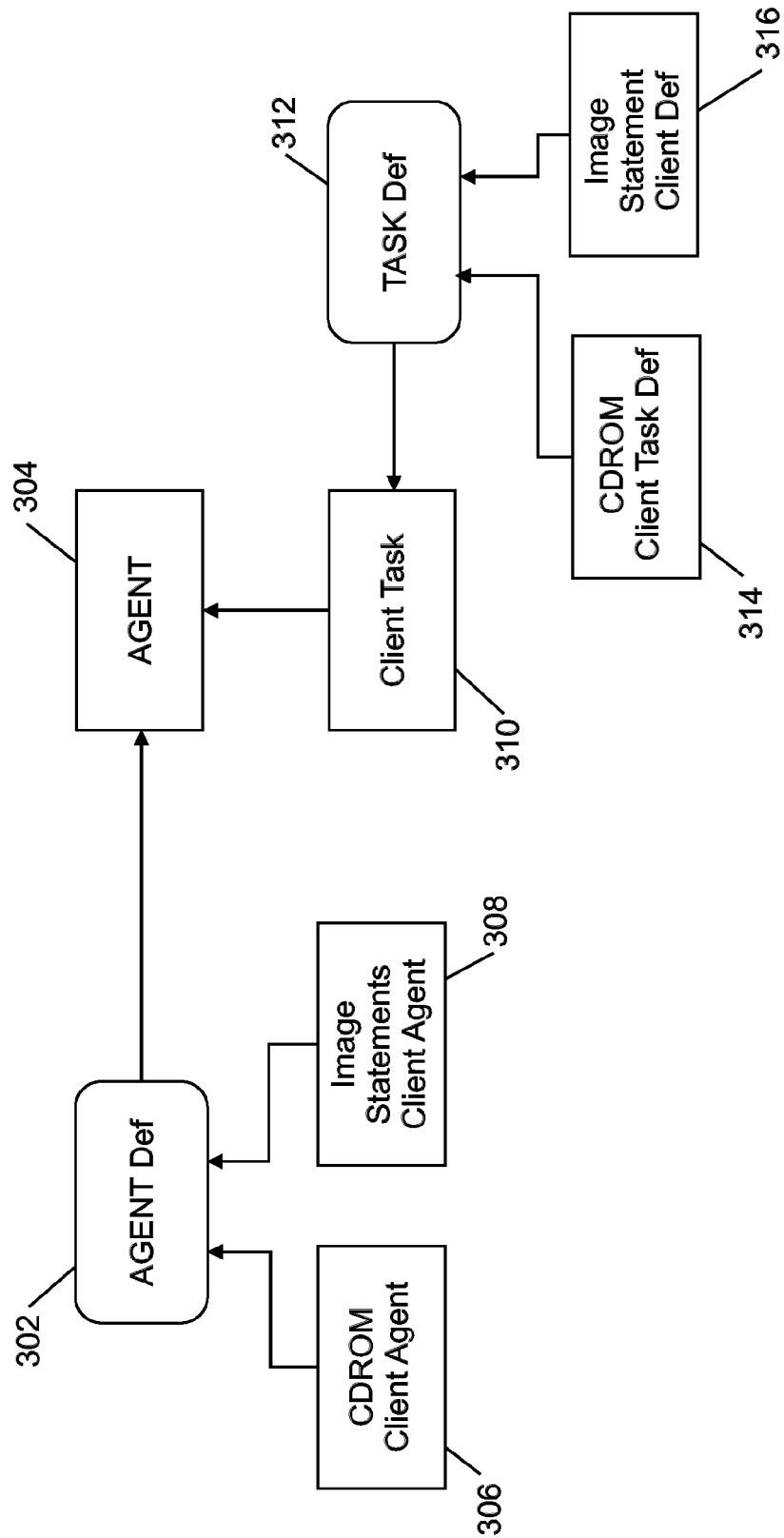
Figure 4:
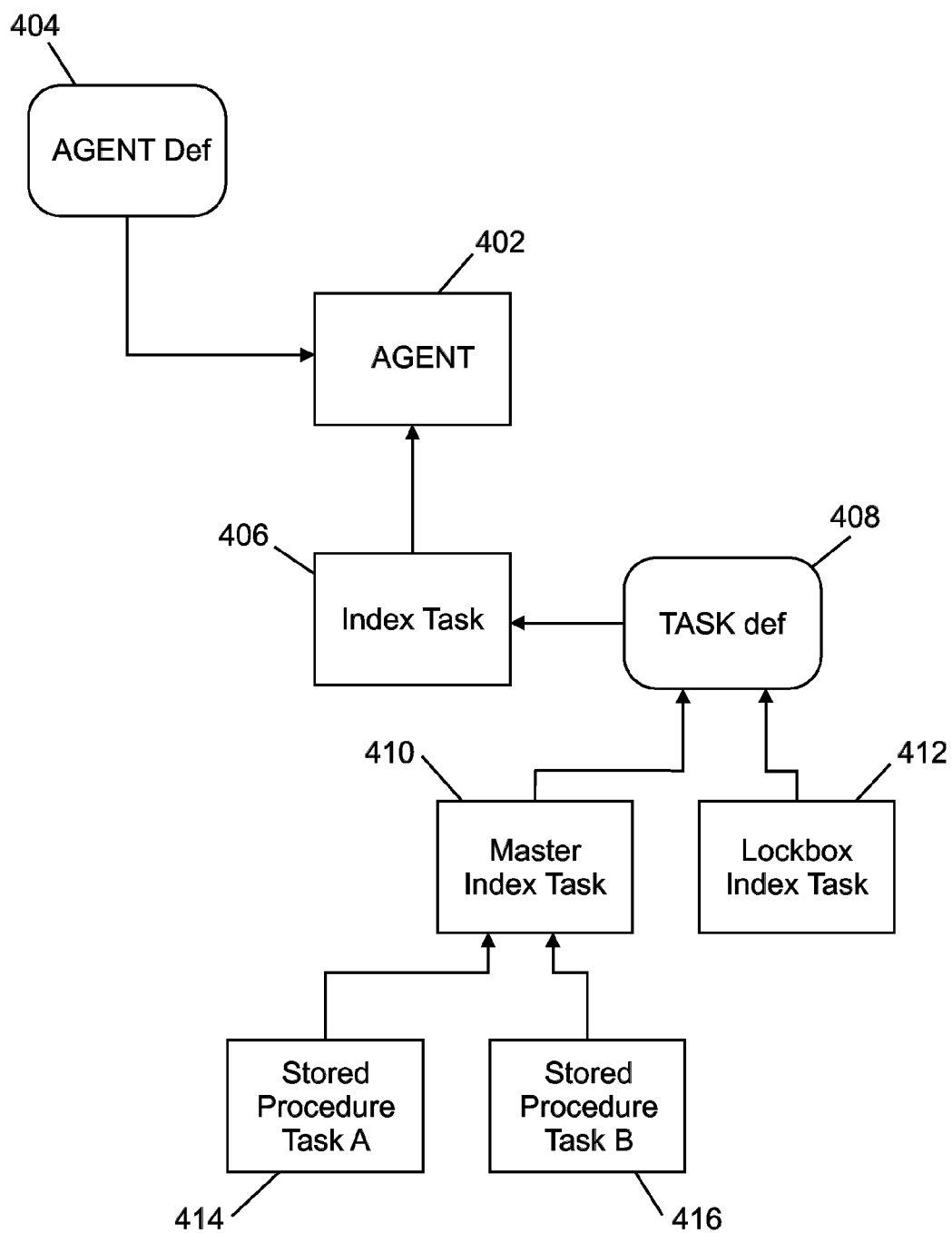

FIGS. 2, 3, and 4 provide conceptual illustrations to further describe some example relationships between various agents, tasks, and definitions. FIG. 2 illustrates a simple case in which agent definition 202 sets up the appropriate information that agent 204 maintains for all tasks. Task definition 206 creates a task, 208, which describes the work to be performed by agent 204.

FIG. 3 illustrates how agents can interact. In FIG. 3, agent definition 302 defines the information which always resides in client agent 304. In this case, however, agent definition 302 is actually provided by two client agents, CD-ROM client agent 306 and image statements client agent 308. Client task 310 provides workflow for client agent 304. Task definition 312 in turn consists of tasks provided by the aforementioned CD-ROM client agent and image statement client agent, task definitions 314 and 316.

Turning to FIG. 4, index agent 402 is defined by agent definition 404. Task 406 for index agent 402 is defined by task definition 408 which in this example is provided by master index task 410 and lockbox task 412. Master index task 410 further includes two stored procedure tasks, stored procedure task A, 414, and stored procedure task B, 416. As will be appreciated from the foregoing, numerous combinations of tasks and agent definitions created either by operators or by other agents can be interconnected to create the appropriate workflows to direct all of the software agents to fulfill client requests. In each case, the agent provides the framework that allows specific tasks to be accomplished. The agent definition provides configuration information to define an agent's functional and operational parameters while the task provides support for the agent to perform the required function based on a task definition including configuration information that defines the functional and operational parameters of the task. In this way flexibility is provided in responding to requests for images by creating appropriate workflows to direct the software agents to search the appropriate indexes, retrieve the appropriate images, put all of the data in the appropriate formats and fulfill each client request.

Figure 5B:
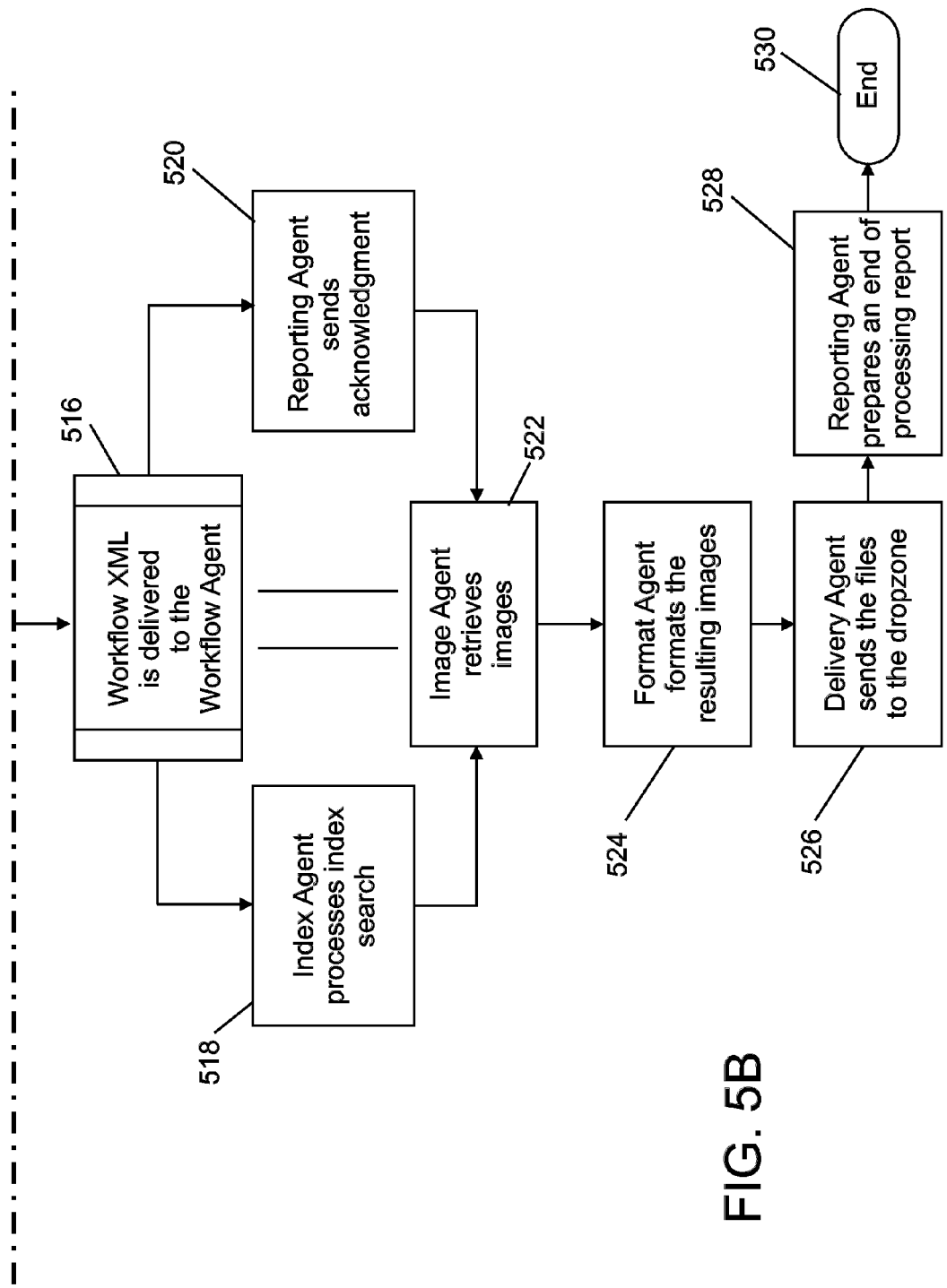

FIGS. 5A-5B (collectively referred to herein as FIG. 5) are a flowchart which describes a process for handling client requests and delivering images in response in a system like the one described above. Like most flowcharts, FIG. 5 illustrates the process as a series of process or sub-process blocks. Process 500 begins at block 502. At block 504, a client system sends a processing request to the system of the invention. The client system uses its own processes to generate and forward the request. At block 506, the client agent in the delivery platform accepts the request and at block 508 the client agent applies business logic validation rules to the request. These validation rules include the application of security tests to ensure that the request is coming from a valid client with appropriate credentials, tests to determine whether the format that the images are requested to be in is in fact supported by the system, and may even be based on such considerations as accounting information and compliance with appropriate privacy policies and regulations. At block 510 a determination is made as to whether the request is valid based on the business logic validation rules applied. If the request is not valid, processing branches to block 512 where process 500 ends. Otherwise, processing branches to block 514 where the appropriate workflow XML is generated and stored.

Still referring to FIG. 5, at block 516, the XML workflow is delivered to the workflow agent. In this example embodiment, blocks 518 and 520 are executed in parallel. At block 518, the index agent processes the appropriate index search, for example, against the master index discussed herein. At block 520, the reporting agent sends the appropriate acknowledgement to the client system that the process has successfully commenced. The reporting agent may also notify users or operators of the indexing and delivery system. At block 522 the appropriate images are retrieved from the appropriate archives. At block 524 the format agent formats the resulting files for delivery to the client, and at block 526 files are sent to a drop zone for client retrieval. As previously discussed, this is but one way in which files might be delivered to a client system and is shown in FIG. 5 as an example only. At block 528 the reporting agent prepares an end of processing report which may be sent either to the client, to administrators or operators of the indexing and delivery system, or to both. At block 530 the process ends.

Figure 6:
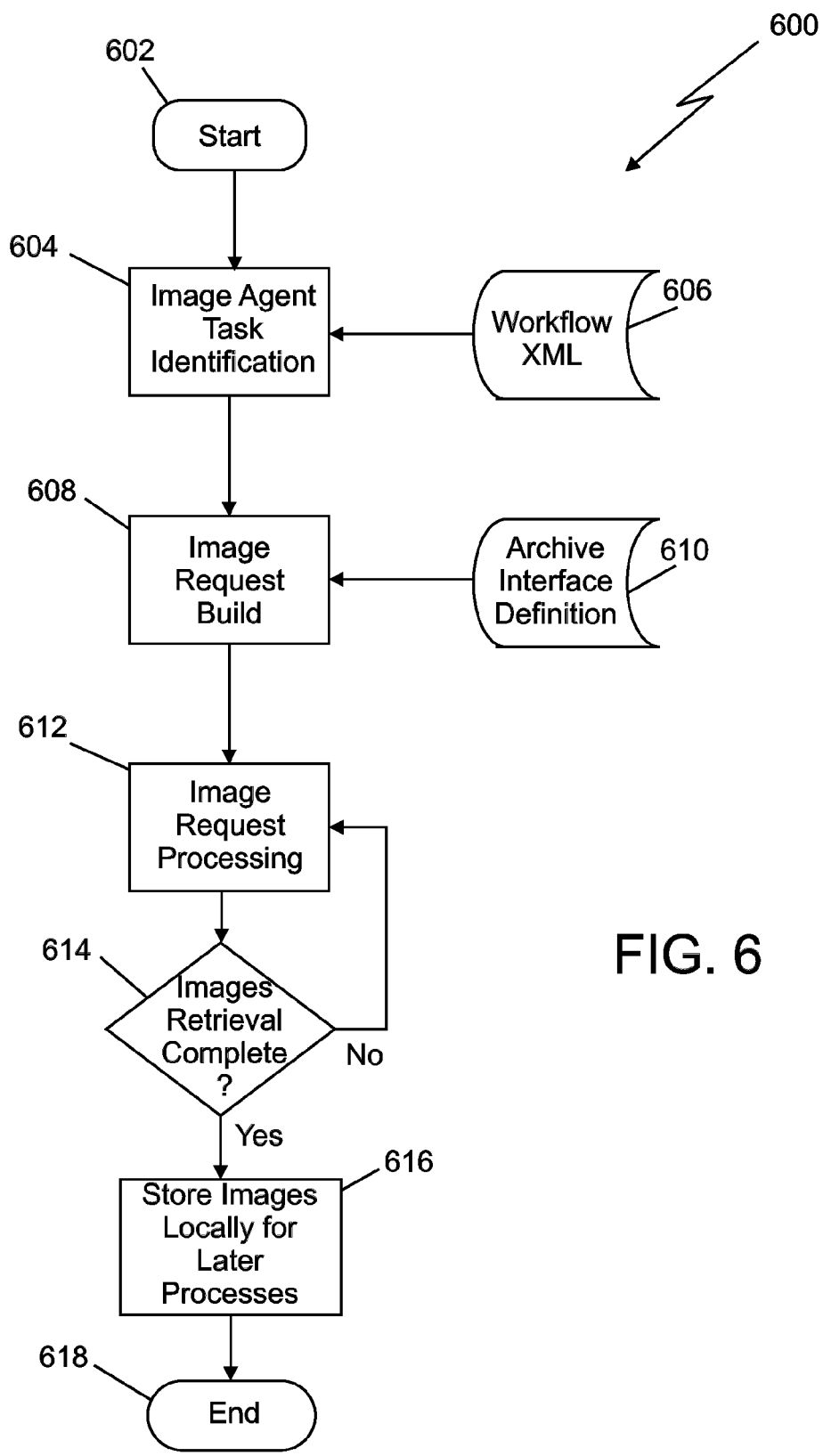
FIG. 6 is a flowchart illustrating the operation of an image agent according to an example embodiment of the invention.

FIG. 6 is a flowchart illustrating an example process of a software agent used in example embodiments of the invention. The example of FIG. 6 is the process of an image agent. Again, the flowchart of FIG. 6 is illustrated as a series of process blocks. Process 600 begins at block 602. Task identification takes place at block 604 with workflow XML input as shown at block 606. The agent builds the image request at block 608 making use of an interface definition, 610, for the particular archive that the image agent needs to access in order to fulfill the pending requests. Image request processing takes place at block 612 as long as the task has yet to be completed at block 614. Once the task is completed at block 614, images are stored locally for use by other agents and later processes at block 616. The image agent process 600 of FIG. 6 ends at block 618.

In order to fully enable the disclosed invention, details of an example image API and master index that can be used with the delivery platforms described above will now be explained. It cannot be overemphasized that these are examples only, and various image retrieval mechanisms and indexing systems can be used with a delivery platform as described above. In at least some embodiments, an image API can reside on a server and receive commands which trigger the retrieval of images based on index information. An appropriate image API can be programmed, for example, in the JAVA programming language, wherein the call of a method against the API causes the instantiation of one or more enterprise JAVA beans in the server system to perform the functionality of the called method. For example, a drill down request bean may process information to provide image access. In such a case the drill down request bean, initiates a connection with one or more information archives or image archive software over a communications interface.

A "master index" as contemplated by this disclosure is a central database for indexing check images throughout an institution. Such a master index would typically include enough information to provide images and image replacement documents as needed in a modern banking enterprise. Such a master index determines the location of requested data, such as check images, and returns the specified records describing the location. The requested data may be located in any data store, for example a short term or long term image archive, including a remote archive or one of the previously mentioned storage systems, such as a CIMS. In example embodiments, such a master index would locate the most appropriate data store and return the necessary information so that the image API tasked with retrieving images from the particular archive can retrieve the appropriate images most efficiently. For example, a master index could use a high performance "DB2" database application. In most embodiments, redundancy would be provided, for example by mirroring the database on two or more large computing systems. For example, a mainframe computing system could be used for each of the systems, and the databases could be designed to use partitioning with multiple objects to maximize the efficiency and reduce maintenance requirements.

FIG. 7 is a flowchart illustrating a process, 700, in which the image API, 702, is interacting with the master index to make an index request. Again, this flowchart illustrates the process as a series of process blocks. Index request 704 is forwarded to the image API which accepts and validates that request at block 706. The image API handling the retrieval performs an index query at block 708. The query is run against master index 710. The API response is formatted at block 712, and the index request, 714 is then returned. In at least some embodiments, the previous example may involve index queries for images which are located outside of the financial institution. By maintaining an index within the financial institution that includes pointers to images stored at remote sites, network traffic can be reduced.

Figure 8A:
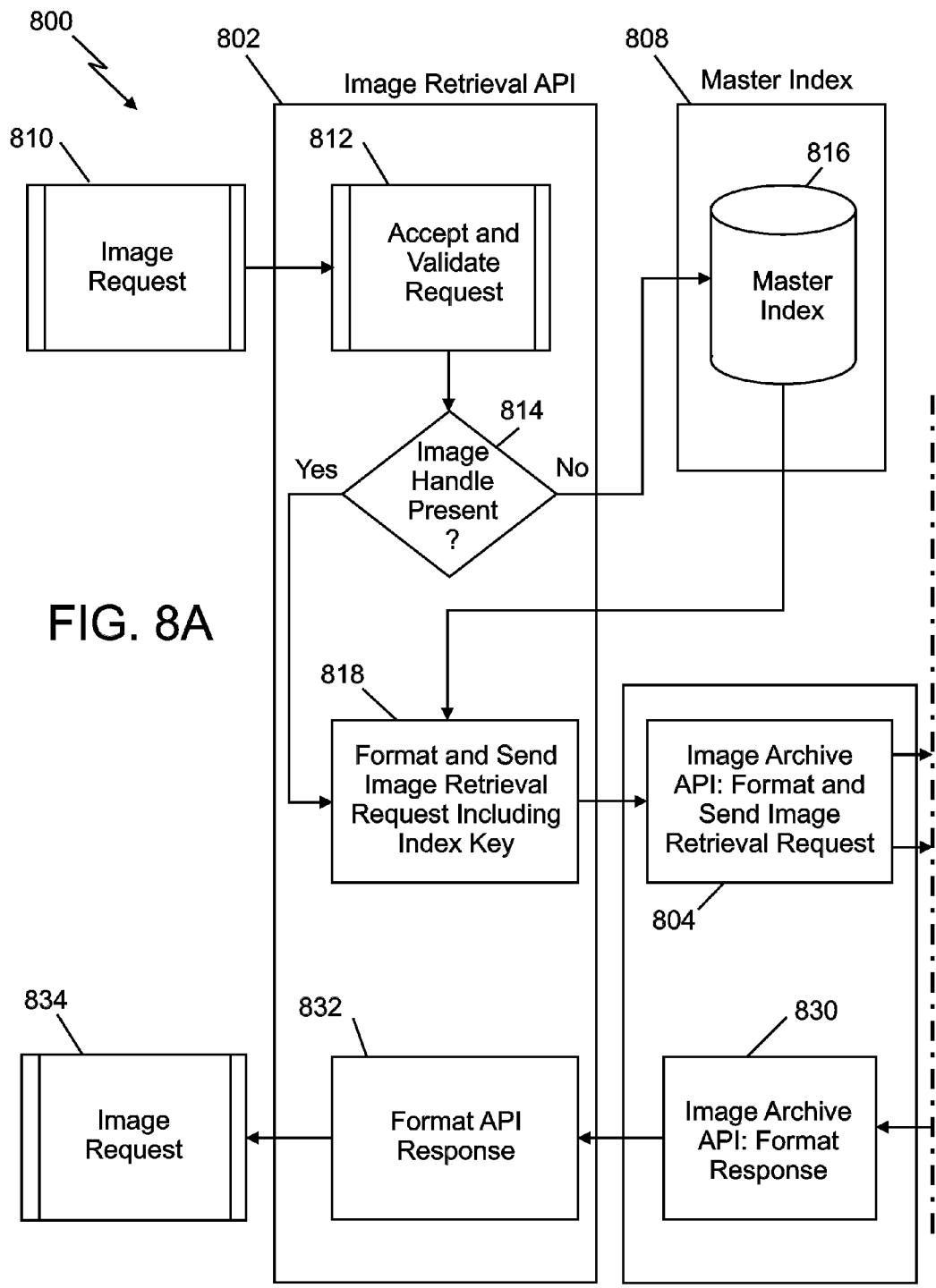

FIGS. 8A-8B (collectively referred to herein as FIG. 8) illustrate an example process, 800, for image retrieval using image API 802 for the index query, and image archive API 804 to retrieve images from image archives 806 based on data in master index system 808. Image request 810 is accepted and validated by the image API at block 812. At block 814 a determination is made as to whether an image handle is present, already stored within image API 802. The image handle is the key that identifies the image in the archive. If the image handle is not present, a query is made to the master index database, 816. If image handle is present, the retrieval request including the index key is formatted and sent at block 818. The image archive API, 804, formats and sends the request at block 820, and image archives 806 create appropriate image retrieval queries 822 and 824 to access image archives 826 and 828. A response is formatted by the archive image API at block 830, and the retrieval image API formats an appropriate response at block 832. Image request 834 is then delivered to the client by the delivery platform previously discussed.

A master index that can be used with example embodiments of the invention receives information on items to be loaded from item processing sites throughout the financial institution. Files are organized according to CPCS cycle date. A history table is maintained which includes the cycle date and an assigned data set name as well as sequence numbers assigned to the various loads to the database. Information is sorted and sort keys are built when information is loaded into the master index. Sort keys can include items sequence numbers, serial numbers, and account numbers. Records can be sorted on the key type and value. Sort output records are written to output files of the various key types. After sorting, a job is built and submitted for a group of tables to be loaded in the database. These tables are used to organize the database into unposted on us items and transit items by un-posted account number sequenced files as well as into posted items. When all of the load jobs are submitted, partition key values are determined to determine into which partitions in the database each record should be placed. A partition table is maintained with cumulative counters for rows inserted into tables in each partition. Each load process adds counts to those counters and statistics are maintained and updated in a stored history table.

Figure 9:
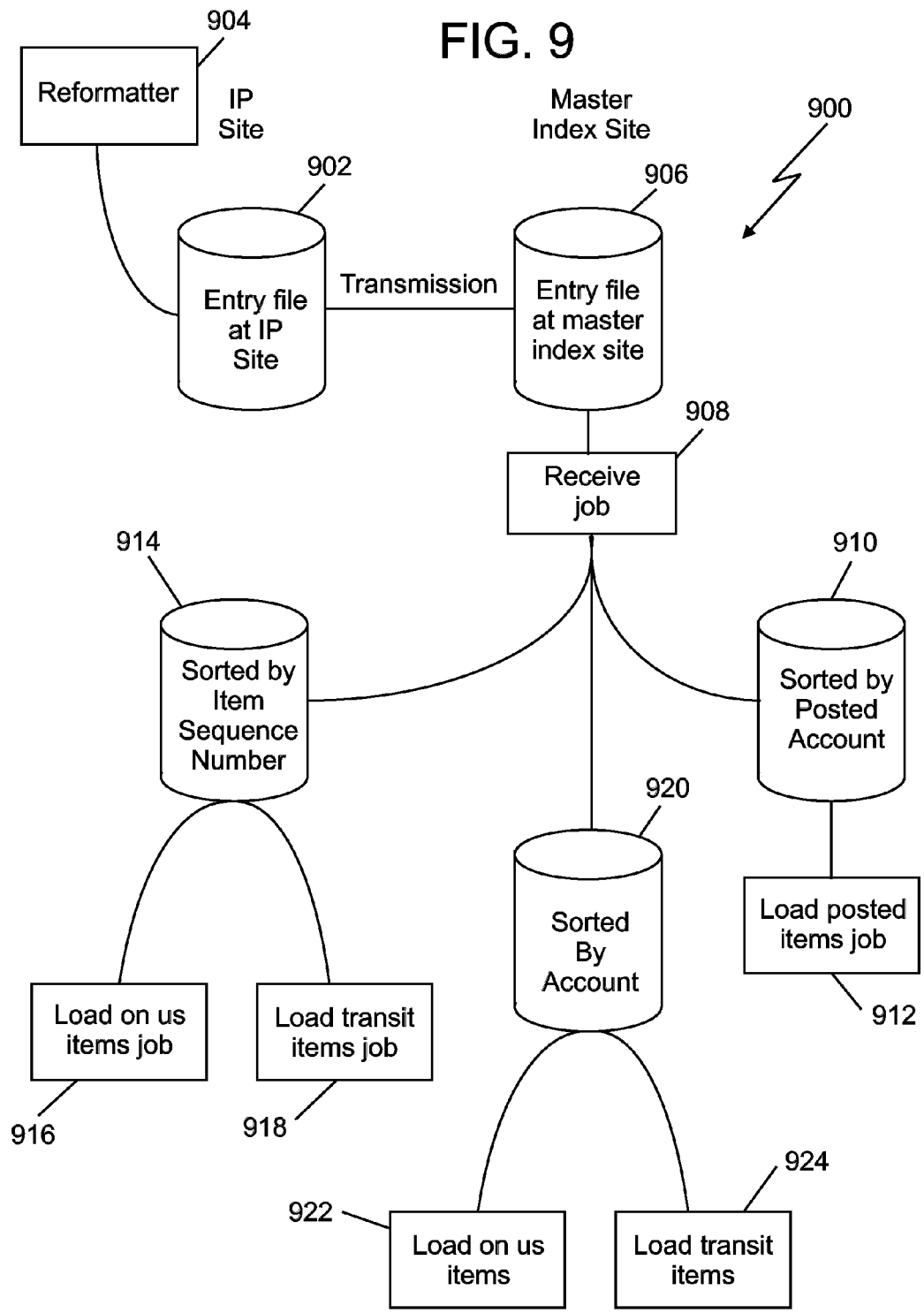
FIG. 9 is an architecture diagram illustrating the organization of a master index as used with example embodiments of the invention.

FIG. 9 provides a conceptual illustration of an example master index architecture as discussed above. Master index architecture 900 receives input in the form of entry file 902 from an item processing (IP) site. In some situations, this file is generated by a reformatter such as reformatter 904. A reformatter is a software program that accepts check processing data as input, changes any fields that need modification (for example the MICR account number could be wrong because the account was renumbered without getting repapered), then sends the data to a storage system, in this case the master index, for long-term storage. Such a file is transmitted to the master index site and becomes entry file 906 for the master index system. As previously discussed, the master index receives the file at block 908 and sorts items contained in the files into posted items, 910 which are then loaded into the index at block 912 and un-posted items 914 sorted by item sequence number, which are further sorted into loads for on us items, 916, and transit items, 918. Items 920 are sorted by account and also divided into loads for on us items, 922, and transit items, 924.

FIG. 10 is a network block diagram illustrating an example of some of the servers and systems that may be involved in implementing embodiments of the present invention. System 1000 of FIG. 10 includes mainframe systems 1002 and 1004 to house the master index as previously discussed. Automated, partitioned databases can be used to minimize the need for database administrator resources to manage the databases. Mainframe computing system 1006 represents the resources of an item processing (IP) site within the financial institution. As can be seen in the drawing, mainframe system 1002 is at location "A" while mainframe 1004 system is at location "B" and it can be assumed for purposes of this example that mainframe system 1006 is at still another location. The mainframes are connected directly via network data mover (NDM) software. NDM is a known, secure connection protocol for large systems.

Still referring to FIG. 10, the mainframe systems are managed by availability and load balancing servers 1008, which connect to the mainframe systems via internal transmission control protocol (TCP) connections. Also connected into the network are delivery platform servers 1009 to provide the delivery processes previously discussed herein as well as requestor services for accessing the master index and local and remote image archives, 1010 and 1012, respectively. As is typical with server computing platforms, delivery platform servers 1009 include fixed storage 1014 on which computer program instructions 1016 reside, to implement the processes of an embodiment of the invention. Computer program code instructions 1016 residing on media 1014 can be loaded into the appropriate servers and cause those servers to execute the processes described herein, as well as maintain the various software agents necessary to carry out the functions of a system according to an example embodiment of the invention. Note that in a typical environment like that shown in FIG. 10, connection to imaging archives is provided via secure socket layer (SSL) connections over either an intranet or the public Internet.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of providing images of indexed documents using an indexing and delivery system comprising a plurality of software agents, the method comprising:

receiving with a client agent via a processor, a request for images of checks, the request including a client-requested delivery format, the client-requested delivery format comprising a client-defined proprietary image format requested by a client;

validating with the client agent via a processor, the request against business rules, validating the request against business rules comprising one or more of (i) applying security tests to ensure the request is coming from a valid client, (ii) determining whether the client-defined proprietary image format is supported, and (iii) determining whether the request is compliant with privacy policies;

creating with the client agent via a processor, a workflow designed for bulk processing of the images to direct the plurality of software agents to complete tasks to fulfill the request, the workflow comprising a translation of the request into a bulk processing format, wherein the plurality of software agents comprises the client agent, a delivery agent, an index agent, a format agent, an image agent, a reporting agent, and a workflow agent, wherein the workflow defines dependencies between the plurality of software agents, wherein the tasks are defined down to a data level so that the plurality of software agents do not maintain state information on the valid client;

supplying, via a processor, the workflow from the client agent to the workflow agent, wherein the workflow agent directs the tasks to the plurality of software agents;

transmitting with the reporting agent via a processor, a first notification to a system associated with the valid client, the first notification acknowledging that the workflow has commenced;

determining with the index agent via a processor, if an image handle for each image is stored in an image application program interface (API), the image handle of each image identifying each image in one or more image archives;

determining with the index agent that the image handle for one or more of the images is not stored in the image application program interface (API);

searching with the index agent via a processor, a master index for each image handle determined to not be stored in the image application program interface (API), wherein the master index comprises one or more automated, partitioned databases comprising tables which organize items stored in the master index into unposted and posted on-us items and transit items;

retrieving with the image agent via a processor, using the image handles, the images for delivery from the one or more image archives according to the workflow in response to the request;

storing locally with the image agent via a processor, the images for delivery for use by the plurality of software agents for additional processes;

formatting with the format agent via a processor, the images for delivery into the client-defined proprietary image format;

delivering with the delivery agent via a processor, the images in bulk to a drop zone according to the workflow; and transmitting with the reporting agent via a processor, a second notification to the valid client and operators of the indexing and delivery system.

2. The method of claim 1, wherein the creating of the workflow further comprises creating an extensible markup language (XML) file.

3. The method of claim 1, wherein delivering the images in bulk to the drop zone comprises delivering the images in bulk to a secure file transfer protocol (FTP) site.

4. A computer program product for providing images of indexed documents, the computer program product including a non-transitory computer-readable storage medium having computer program code embodied thereon, the computer program code embodied on the non-transitory computer-readable storage medium comprising:

instructions for receiving with a client agent a request for images of checks, the request including a client-requested delivery format, the client-requested delivery format comprising a client defined proprietary image format requested by the client:

instructions for validating with the client agent the request against business rules, validating the request against business rules comprising one or more of (i) applying security tests to ensure the request is coming from a valid client, (ii) determining whether the client-defined proprietary image format is supported, and (iii) determining whether the request is compliant with privacy policies;

instructions for creating with the client agent a workflow designed for bulk processing of the images to direct a plurality of software agents to complete tasks to fulfill the request, the workflow comprising a translation of the request into a bulk processing format, wherein the plurality of software agents comprises the client agent, a delivery agent, an index agent, a format agent, an image agent, a reporting agent, and a workflow agent, wherein the workflow defines dependencies between the plurality of software agents, wherein the tasks are defined down to a data level so that the plurality of software agents do not maintain state information on the valid client:

instructions for supplying the workflow from the client agent to the workflow agent, wherein the workflow agent directs the tasks to the plurality of software agents:

instructions for transmitting with the reporting agent a first notification to a system associated with the valid client, the first notification acknowledging that the workflow has commenced:

instructions for determining with the index agent if an image handle for each image is stored in an image application program interface (API), the image handle of each image identifying each image in one or more image archives;

instructions for determining with the index agent that the image handle for one or more of the images is not stored in the image application program interface (API);

instructions for searching with the index agent a master index for each image handle determined to not be stored in the image application program interface (API), wherein the master index comprises one or more automated, partitioned databases comprising tables which organize items stored in the master index into unposted and posted onus items and transit items;

instructions for retrieving with the image agent, using the image handles, the images for delivery from the one or more image archives according to the workflow in response to the request;

instructions for storing locally with the image agent via a processor, the images for delivery for use by the plurality of software agents for additional processes;

instructions for formatting with the format agent the images for delivery into the client-defined proprietary image format;

instructions for delivering with the delivery agent the images in bulk to a drop zone according to the workflow; and instructions for transmitting with the reporting agent a second notification to the valid client and operators of the indexing and delivery system.

5. The computer program product of claim 4, wherein the computer program code further comprises instructions for creating the workflow in extensible markup language (XML).

6. The computer program product of claim 4, wherein the instructions for delivering the images in bulk comprise instructions for delivering the images in bulk to a secure file transfer protocol (FTP) site.

7. An apparatus for providing images of indexed documents in response to client requests, the apparatus comprising:

means for receiving with a client agent a request for images of checks, the request including a client-requested delivery format, the client-requested delivery format comprising a client-defined proprietary image format requested by a client;

means for validating with the client agent the request against business rules, validating the request against business rules comprising one or more of (i) applying security tests to ensure the request is coming from a valid client, (ii) determining whether the client-defined proprietary image format is supported, and (iii) determining whether the request is compliant with privacy policies;

means for creating with the client agent a workflow designed for bulk processing of the images to direct a plurality of software agents to complete tasks to fulfill the request, the workflow comprising a translation of the request into a bulk processing format, wherein the plurality of software agents comprises the client agent, a delivery agent, an index agent, a format agent, an image agent, a reporting agent, and a workflow agent, wherein the workflow defines dependencies between the plurality of software agents, wherein the tasks are defined down to a data level so that the plurality of software agents do not maintain state information on the valid client;

means for supplying the workflow from the client agent to the workflow agent, wherein the workflow agent directs the tasks to the plurality of software agents;

means for transmitting with the reporting agent a first notification to a system associated with the valid client, the first notification acknowledging that the workflow has commenced;

means for determining with the index agent if an image handle for each image is stored in an image application program interface (API), the image handle of each image identifying each image in one or more image archives;

means for determining with the index agent that the image handle for one or more of the images is not stored in the image application program interface (API);

means for searching with the index agent a master index for each image handle determined to not be stored in the image application program interface (API), wherein the master index comprises one or more automated, partitioned databases comprising tables which organize items stored in the master index into unposted and posted on-us items and transit items;

means for retrieving with the image agent, using the image handles, the images for delivery from the one or more image archives according to the workflow in response to the request;

means for storing locally with the image agent via a processor, the images for delivery for use by the plurality of software agents for additional processes;

means for formatting with the format agent the requested images into the client-defined proprietary image format;

means for delivering with the delivery agent the images in bulk to a drop zone according to the workflow; and means for transmitting with the reporting agent a second notification to the valid client and operators of the indexing and delivery system.

8. The apparatus of claim 7, further comprising means for storing the workflow in extensible markup language (XML).

9. The apparatus of claim 7, wherein the means for delivering the images in bulk comprise means for delivering the images in bulk to a secure file transfer protocol (FTP) site.

10. A document indexing and delivery system comprising a plurality of software agents, the system comprising:

one or more image archives for storing images of checks, the one or more image archives comprising a non-transitory computer-readable medium for storing the images of checks;

a master index to maintain information to be used to locate the images of checks in the one or more image archives;

a delivery platform to provide the images of checks in response to client requests; and an image application program interface (API) to retrieve images from the image archive;

wherein the delivery platform comprises a processor configured for:

receiving with a client agent a request for the images of checks, the request including a client-requested delivery format, the client-requested delivery format comprising a client-defined proprietary image format requested by a client;

validating with the client agent the request against business rules, validating the request against business rules comprising one or more of (i) applying security tests to ensure the request is coming from a valid client, (ii) determining whether the client-defined proprietary image format is supported, and (iii) determining whether the request is compliant with privacy policies;

creating with the client agent a workflow designed for bulk processing of the images to direct the plurality of software agents to complete tasks to fulfill the request, the workflow comprising a translation of the request into a bulk processing format, wherein the plurality of software agents comprises the client agent, a delivery agent, an index agent, a format agent, an image agent, a reporting agent, and a workflow agent, wherein the workflow defines dependencies between the plurality of software agents, wherein the tasks are defined down to a data level so that the plurality of software agents do not maintain state information on the valid client;

supplying the workflow from the client agent to the workflow agent, wherein the workflow agent directs the tasks to the plurality of software agents;

transmitting with the reporting agent a first notification to a system associated with the valid client, the first notification acknowledging that the workflow has commenced;

determining with the index agent if an image handle for each image is stored in an image application program interface (API), the image handle of each image identifying each image in one or more image archives;

determining with the index agent that the image handle for one or more of the images is not stored in the image application program interface (API);

searching with the index agent the master index for each image handle determined to not be stored in the image application program interface (API), wherein the master index comprises one or more automated, partitioned databases comprising tables which organize items stored in the master index into unposted and posted on-us items and transit items;

retrieving with the image agent using the image handles, the images for delivery from the one or more image archives according to the workflow in response to the request;

storing locally with the image agent the images for delivery for use by the plurality of software agents for additional processes;

formatting with the format agent the images for delivery into the client-defined proprietary image format;

delivering with the delivery agent the images in bulk to a drop zone according to the workflow; and transmitting with the reporting agent a second notification to the valid client and operators of the indexing and delivery system.

11. The system of claim 10, wherein the master index is disposed in at least two mirrored, partitioned databases.

12. The system of claim 11, further comprising a server to provide load balancing between the at least two, mirrored, partitioned databases.

13. The system of claim 10, wherein delivering the images in bulk to the drop zone comprises delivering the images in bulk to a secure file transfer protocol (FTP) site.

* * * * *